(12) United States Patent
Kim et al.

(10) Patent No.: US 12,470,801 B2
(45) Date of Patent: Nov. 11, 2025

(54) DRIVING METHOD FOR HEIGHT ADJUSTABLE BIOLOGICAL SIGNAL MEASURING DEVICE

(71) Applicant: WONTECH Co., Ltd., Daejeon (KR)

(72) Inventors: Jong Won Kim, Seongnam-si (KR); Jung Hyun Kim, Seongnam-si (KR); Young Seok Seo, Sejong-si (KR); Changhee Park, Daejeon (KR); Janghyun Mun, Sejong-si (KR); Seunghun Park, Sejong-si (KR)

(73) Assignee: WONTECH Co., Ltd., Daejeon (KR)

( * ) Notice: Subject to any disclaimer, the term of this patent is extended or adjusted under 35 U.S.C. 154(b) by 66 days.

(21) Appl. No.: 18/443,080

(22) Filed: Feb. 15, 2024

(65) Prior Publication Data

US 2025/0240514 A1 Jul. 24, 2025

(30) Foreign Application Priority Data

Jan. 18, 2024 (KR) .................. 10-2024-0008190

(51) Int. Cl.
*H04N 23/661* (2023.01)
*G06V 10/26* (2022.01)
(Continued)

(52) U.S. Cl.
CPC ......... *H04N 23/611* (2023.01); *G06V 10/267* (2022.01); *G06V 10/759* (2022.01);
(Continued)

(58) Field of Classification Search
CPC ...... H04N 23/611; H04N 23/21; H04N 23/67; H04N 23/695; H04N 23/84; G06V 10/267;
(Continued)

(56) References Cited

U.S. PATENT DOCUMENTS

2016/0048723 A1* 2/2016 Jeong ................. G06F 18/22
382/197
2019/0380807 A1* 12/2019 Addison ............... G16H 40/60
(Continued)

FOREIGN PATENT DOCUMENTS

CN 105578024 B * 1/2018
JP 2008167987 A * 7/2008
(Continued)

OTHER PUBLICATIONS

KR Office Action.

*Primary Examiner* — Shadan E Haghani
(74) *Attorney, Agent, or Firm* — Harvest IP Law, LLP

(57) ABSTRACT

Proposed is a driving method for a height-adjustable biological signal measuring device. The method includes a step of recognizing a user's unique information, a step of setting the focus of a video image measuring device to a preset value, a step of photographing the user and acquiring the user's images from the video image measuring device, a step of acquiring the image data from the photographed video image data and preprocessing the images in a video image processing unit, a step of recognizing a face according to the user's state using the pre-processed image, a step of determining whether the user's face is at the center of the screen, and a step of fixing the position of a terminal and measuring the user's biometric information.

14 Claims, 5 Drawing Sheets

(51) Int. Cl.
  *G06V 10/75* (2022.01)
  *G06V 10/778* (2022.01)
  *G06V 20/40* (2022.01)
  *G06V 40/10* (2022.01)
  *G06V 40/16* (2022.01)
  *H04N 23/21* (2023.01)
  *H04N 23/611* (2023.01)
  *H04N 23/67* (2023.01)
  *H04N 23/695* (2023.01)
  *H04N 23/84* (2023.01)

(52) U.S. Cl.
  CPC ............ *G06V 10/778* (2022.01); *G06V 20/41* (2022.01); *G06V 40/15* (2022.01); *G06V 40/162* (2022.01); *G06V 40/166* (2022.01); *G06V 40/172* (2022.01); *H04N 23/21* (2023.01); *H04N 23/67* (2023.01); *H04N 23/695* (2023.01); *H04N 23/84* (2023.01)

(58) Field of Classification Search
  CPC .... G06V 10/759; G06V 10/778; G06V 20/41; G06V 40/15; G06V 40/162; G06V 40/166; G06V 40/172
  See application file for complete search history.

(56) References Cited

U.S. PATENT DOCUMENTS

| | | | |
|---|---|---|---|
| 2020/0256734 A1* | 8/2020 | Zhu | G01J 5/0806 |
| 2022/0071573 A1* | 3/2022 | Ortega | A61B 6/4429 |
| 2023/0063221 A1* | 3/2023 | Marks | A61B 5/1176 |
| 2023/0349936 A1* | 11/2023 | Lee | G01N 35/00732 |
| 2024/0020843 A1* | 1/2024 | Padilha | G06V 10/25 |

FOREIGN PATENT DOCUMENTS

| | | |
|---|---|---|
| KR | 10-2016-0115501 A | 10/2016 |
| KR | 10-2020-0134931 A | 12/2020 |
| KR | 10-2021-0084400 A | 7/2021 |
| KR | 10-2021-0109742 A | 9/2021 |

* cited by examiner

DRIVING METHOD FOR HEIGHT ADJUSTABLE BIOLOGICAL SIGNAL MEASURING DEVICE

CROSS REFERENCE TO RELATED APPLICATION

The present application claims priority to Korean Patent Application No. 10-2024-0008190, filed on Jan. 18, 2024, the entire contents of which are incorporated herein for all purposes by this reference.

BACKGROUND

Technical Field

The present disclosure relates to a method of measuring biological signals and, more particularly, to a driving method for a biological signal measuring device whose height is adjustable depending on a user's height.

Description of the Related Art

The most common technique to perform photoplethysmography (PPG) using light uses a method to analyze the quantity of light of the transmittance with respect to light by which the human body is irradiated and is explained by the Beer-Lambert law, which states that absorbance is proportional to the concentration of the absorbing substance and the thickness of the absorbing layer. According to tis law, the change in transmitted light results in a signal that is proportional to the change in the volume of the substance being transmitted, so PPG can be used to determine the condition of the heart, for example, even when the absorbance of the substance is not known.

Recently, technology using rPPG (remote photoplethysmography) is emerging, going one step further from technology using PPG. As the most popular technology to identify signals related to heartbeat using PPG, it obtains PPG by directly contacting the human body with a device with a camera and light attached at close range, such as a smartphone and by emitting light and immediately measuring the transmittance, but recently, technology on rPPG that identifies changes in the volume of blood vessels from signals acquired from video images photographed by the camera is continuously being researched and developed.

Since not requiring contact between the subject and the measurement equipment, technology using rPPG can be applied in a variety of devices and places equipped with cameras, such as airport immigration offices and telemedicine.

However, rPPG technology has a major problem in that the signal is affected by the noise generated by the ambient light and the movement of the subject in the process of photographing the subject with the camera, and there is a need for a product to be easy to move and set up for the convenience of the user.

Documents of Related Art (Patent Document 1) Korea Patent Application Publication No. 10-2021-0084400A

SUMMARY

An objective of the present disclosure for solving the above problem is to provide a driving method for a height-adjustable biological signal measuring device that automatically adjusts its height to match the user's height so that the user's face may be positioned at the center of the camera.

In addition, an objective of the present disclosure is to provide a driving method for the height-adjustable biological signal measuring device that irradiates users with infrared wavelength lasers and RGB cameras, photographs the reflected R-value and the change of the infrared wavelength laser as video images, and then analyzes the video images to measure the user's bio-signal.

The driving method for the height-adjustable biological signal measuring device of the present disclosure for achieving the objective above may include a step of recognizing a user's unique information, a step of setting the focus of a video image measuring device to a preset value when the user recognition is completed, a step of photographing the user and acquiring the user's images from the video image measuring device when the focus of the video image measuring device is set, a step of acquiring the image data from the photographed video image data and preprocessing the images in a video image processing unit, a step of recognizing a face according to the user's state using the preprocessed image when the image is pre-processed, a step of determining whether the user's face is at the center of the screen after processing the user's state and face recognition, and a step of fixing the position of a terminal and measuring the user's biometric information when the user's face is determined to be at the center of the screen, wherein the user's bio-signals are measured by irradiating the user's face with near-infrared rays from an optical output unit of the terminal and analyzing the irradiating near-infrared rays in the video image with the video image measuring device.

The method of recognizing the user's unique information in a subject recognizer may be done using at least one of RFID, QR, bar code, and fingerprint.

The focus that is set in the step of setting the focus of the video image measuring device to a preset value may be the focus setting according to the distance between the terminal and a subject, wherein the focus setting value according to the distance between the terminal and the subject is stored in the central server and is changeable according to the installed environment.

In the step of photographing the user and acquiring the user's video images from the video image measuring device, photographing video images may be adjustable in height while the terminal moves and photographs video images from the top of the holder to the bottom.

In the step of acquiring the images from the photographed video image data and preprocessing the images, the image preprocessing is a process of converting an image of an RGB channel into HSV, and the acquired image may be tabulated by putting RGB values and HSV values into data.

The range to acquire the RGV value and the HSV value may be obtained from the preset range value and may be changeable depending on the user's settings, but RGB values corresponding to the position of an analysis target coordinate may be acquired in the present disclosure.

The step of recognizing the user's state and face may recognize the user's state and face by comparing the data of RGB values and HSV values of the acquired image with the data table of RGB values and HSV values of the standard images in which the user's face is at the center of the screen in the central server.

The data table of RGB values and HSV values for the standard images stored in the central server may be created in the video image processing unit and the driving method may further include a step of loading from the central server and inserting the standard image in which the user's face is at the center of the screen, a step of converting the image of the inserted RGB channel to HSV, a step of segmenting the converted HSV image into regions, a step of analyzing in the video image processing unit the RGB values and HSV values corresponding to the analysis target coordinate among the images whose region is segmented, and putting the analyzed RGB values and HSV values into data to store into the central server in the form of a table, a step of matching in the data matching unit the RGB and HSV values corresponding to the analysis target coordinate of the user's preprocessed image to be analyzed using the data table stored in the central server, a step of determining whether the image to be processed is matched when the table of RGB values and HSV values learned as above in the central server matches the table of RGB values and HSV values of the user's image to be analyzed, and a step of fixing the position of the terminal and measuring the user's biometric information when the image to be processed is matched.

In the step of segmenting the converted HSV image into regions, the segmentation may be any one of two, four, six, and eight.

The learning data may be stored in the central server while accumulatively learning from the resultant data by continuously repeating steps ranging from the step of loading from the central server and inserting the standard image in which the user's face is at the center of the screen to the step of analyzing the image and storing the data.

A plurality of standard images may be stored in the central server and may be analyzed sequentially or randomly.

In the step of matching RGB values and HSV values corresponding to the analysis target coordinate of the user's preprocessed image to be analyzed in the data matching unit using the data table stored in the central server, the unique RGB value and HSV value according to the color of the entire analysis target coordinate may be compared.

The driving method may further include a step of matching the values of a first region, a second region, and a third region among RGB values and HSV values in the analysis target coordinate when the image to be processed is not matched in the step of determining whether the image to be processed is matched when matching the table of RGB values and HSV values learned as above in the central server with the table of RGB values and HSV values of the user's image to be analyzed.

The driving method may further include a step of determining whether the region data of the image to be processed is matched when matching the first region to third region values and a step of fixing the position of the terminal and measuring the user's biometric information when the region data of the image to be processed is matched.

In the step of determining whether the region data of the image to be processed is matched when matching the first region to third region values, a step of acquiring the user's video images from the video image measuring device may be performed again when the region data of the image to be processed is not matched.

According to these features, the present disclosure may reduce errors caused by the angle of video image data collection by adjusting the height of the terminal according to the height of each user, thereby increasing the reliability of the results.

In addition, there is an effect of obtaining highly reliable results by adjusting the height and positioning the user's face at the center of the video image without being restricted by the state in which the user is being photographed.

DETAILED DESCRIPTION OF THE DISCLOSURE

Figure 1:
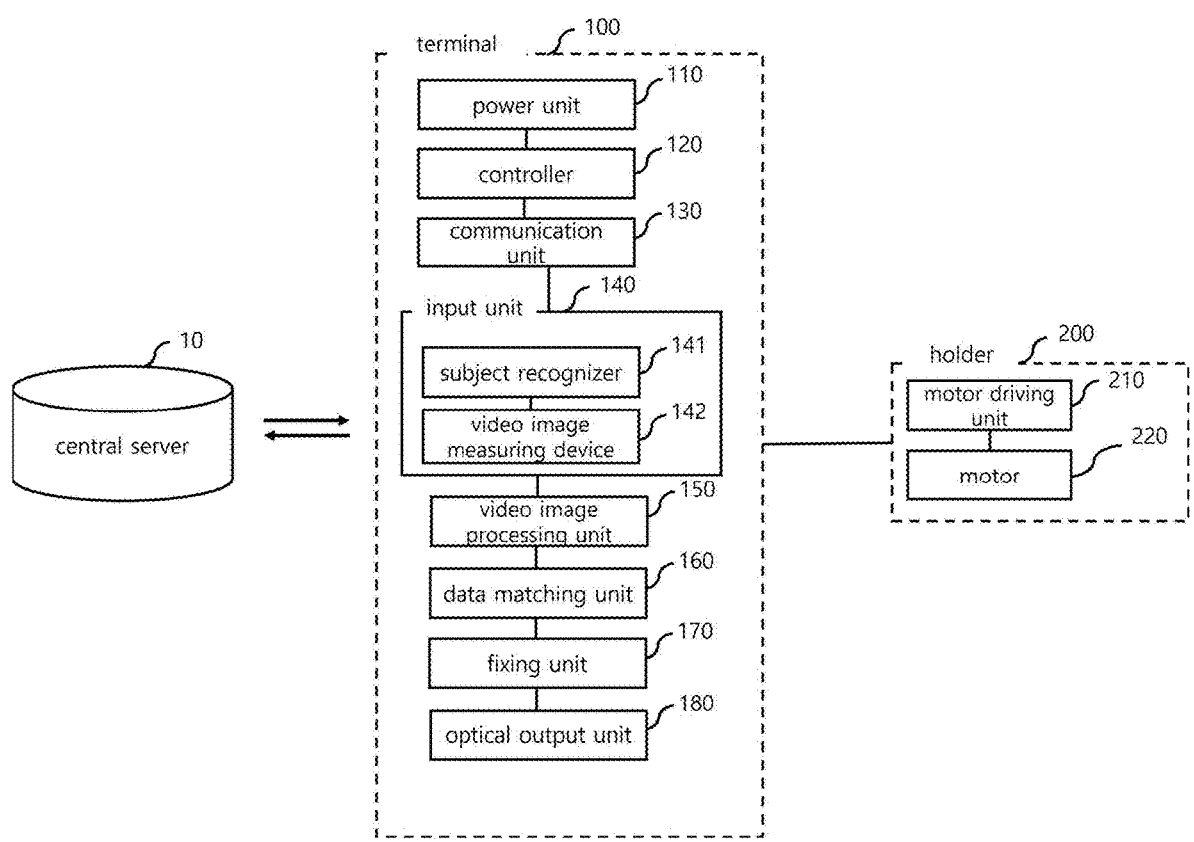
FIG. 1 is a configuration diagram of a biological signal measuring device capable of adjusting height according to an exemplary embodiment of the present disclosure.

In the following, exemplary embodiments of the present disclosure will be described in detail with reference to the accompanying drawings so that those of ordinary skill in the technical field to which the present disclosure belongs may easily implement it. However, the present disclosure may be implemented in several different forms and is not limited to the exemplary embodiments described herein. In addition, in order to clearly explain the present disclosure in the drawings, parts irrelevant to the description are omitted, and similar reference numerals are attached to similar parts throughout the specification.

Throughout the specification, when a part is "connected (linked, contacted, or combined)" with another part, this includes not only cases where it is "directly connected" but also cases where it is "indirectly connected" with another member in between. Also, when a part "includes" a component, this means that it may have other components, rather than excluding them, unless otherwise stated.

The terms used herein are used only to describe specific exemplary embodiments and are not intended to limit the present disclosure. Singular expressions include plural expressions unless the context clearly indicates otherwise. In this specification, terms such as "to include" or "have" are intended to specify that features, numbers, steps, actions, components, parts or combinations thereof described in the specification exist, and should be understood not to preclude the existence or addition of one or more other features or numbers, steps, actions, components, parts or combinations thereof.

Then, a driving method for a biological signal measuring device capable of adjusting height according to an exemplary embodiment of the present disclosure will be described with reference to FIGS. 1 and 2.

Figure 2:
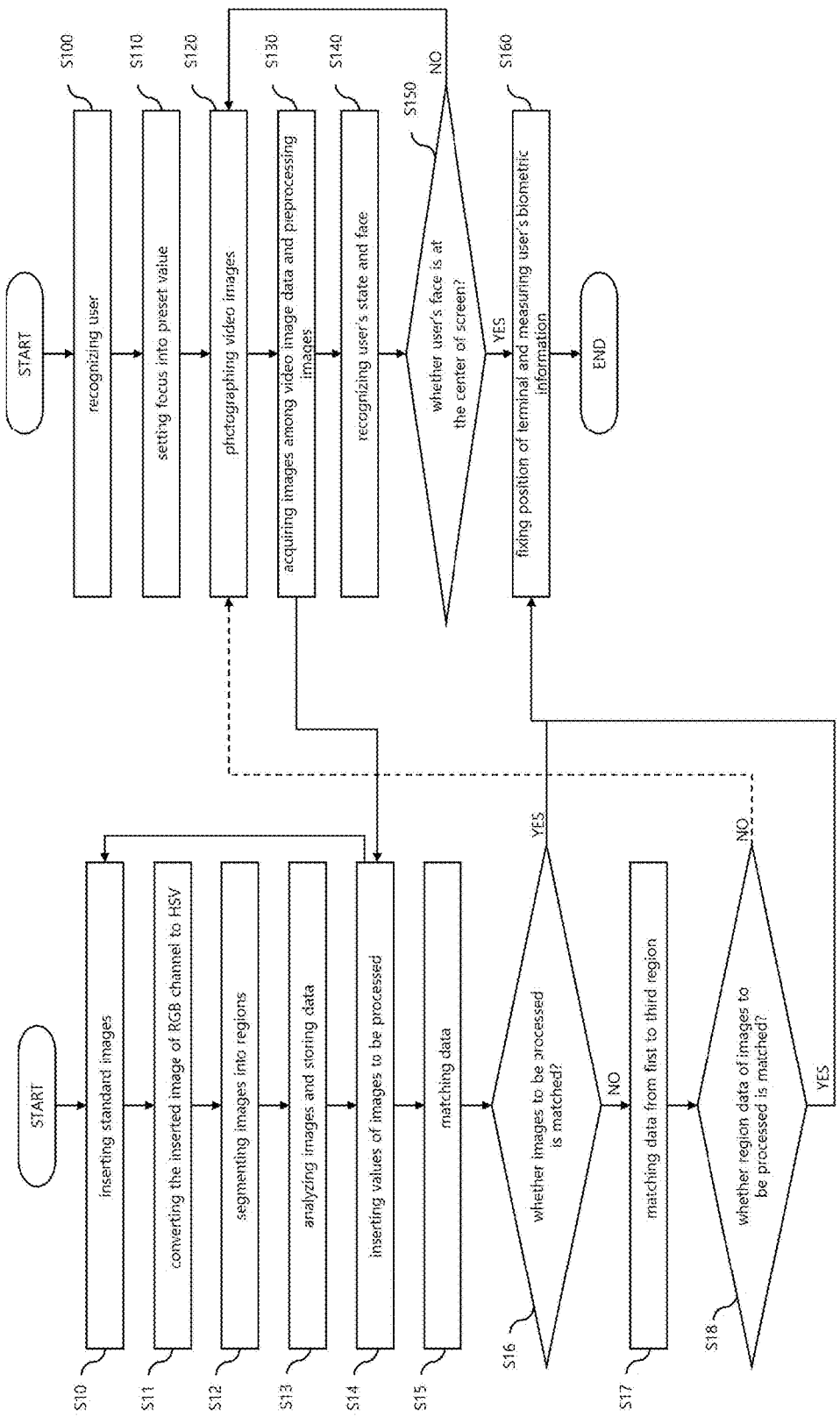
FIG. 2 is a flowchart of a driving method for a biological signal measuring device capable of adjusting height according to an exemplary embodiment of the present disclosure.
Figure 3:
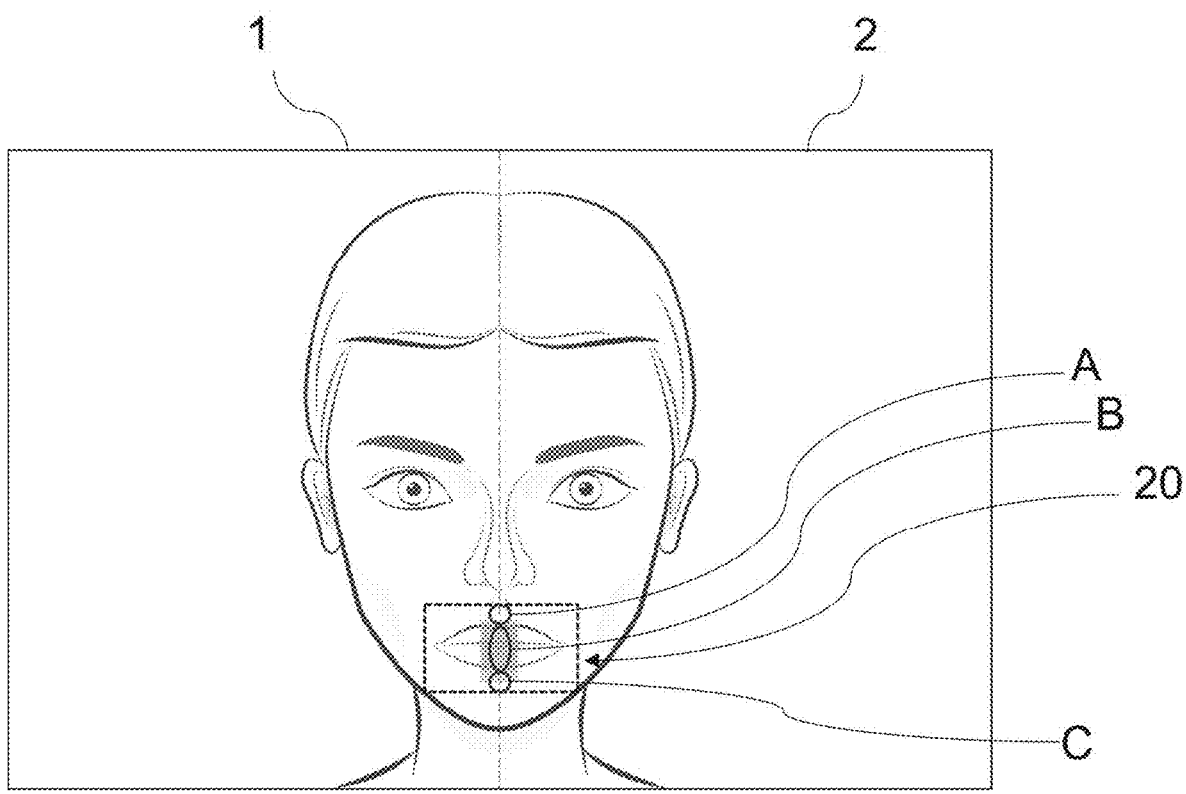
FIG. 3 is an exemplary diagram in which a converted HSV image is segmented into two regions.
Figure 4:
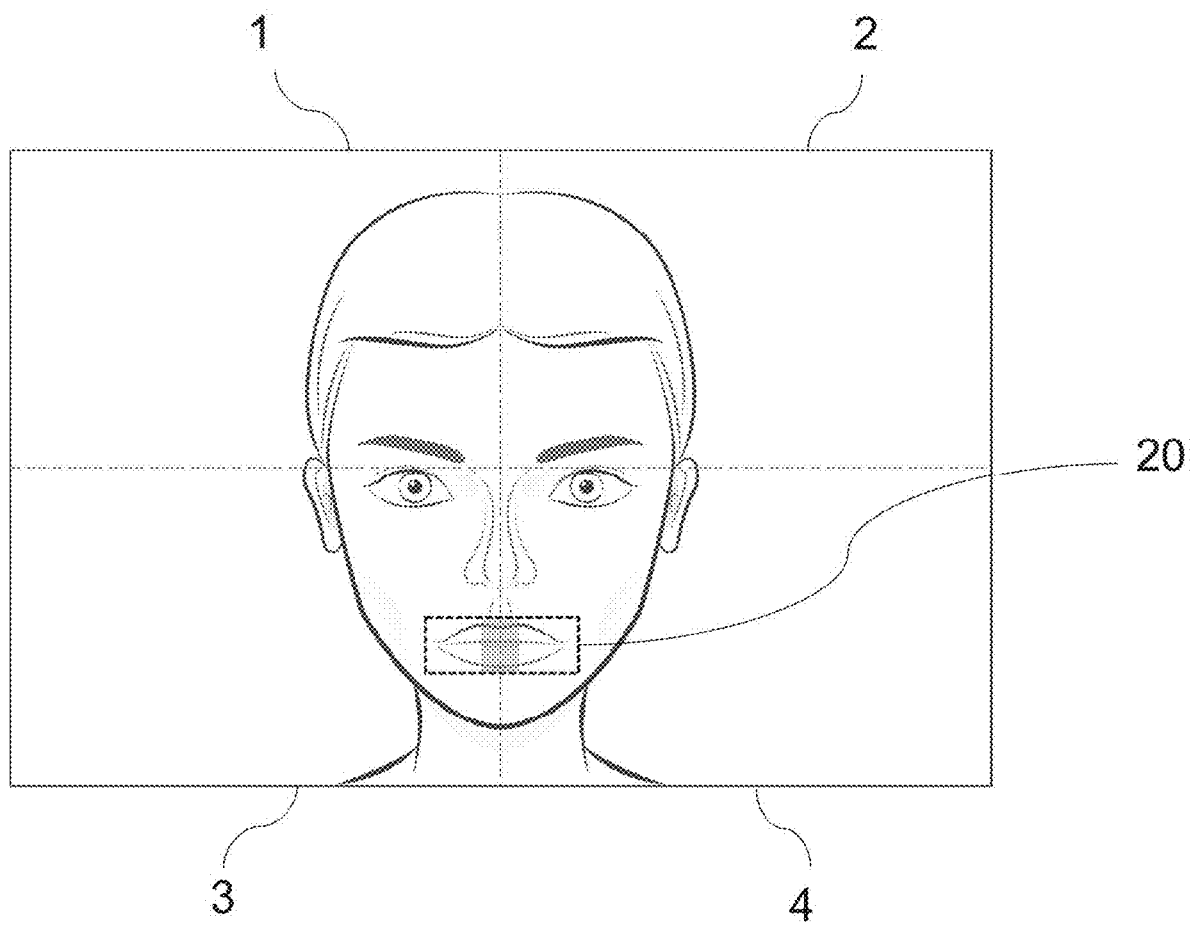
FIG. 4 is an exemplary diagram in which a converted HSV image is segmented into four regions.

FIG. 1 is a configuration diagram of a biological signal measuring device capable of adjusting height according to an exemplary embodiment of the present disclosure and FIG. 2 is a flowchart of a driving method for a biological signal measuring device capable of adjusting height according to an exemplary embodiment of the present disclosure. FIG. 3 is an exemplary diagram in which a converted HSV image is segmented into two regions, FIG. 4 is an exemplary diagram in which a converted HSV image is segmented into four regions, and FIG. 5 is an exemplary diagram in which a converted HSV image is segmented into six regions.

Figure 5:
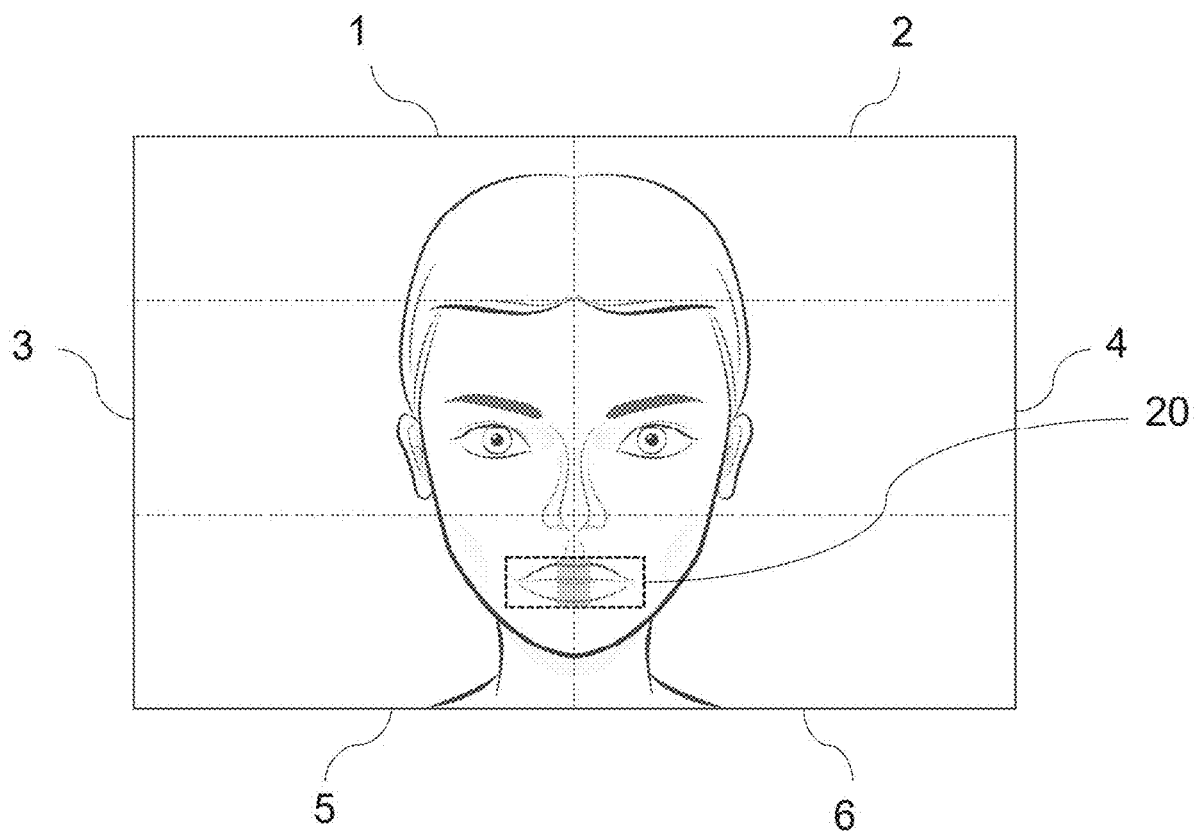
FIG. 5 is an exemplary diagram in which a converted HSV image is segmented into six regions.

Referring to FIGS. 1 and 5, the biological signal measuring device capable of adjusting height may include a central server 10, a terminal 100, and a holder 200 to which the terminal may be attached.

The terminal 100 may include a power unit 110 that receives and supplies electric power in order to enable overall operations, a controller 120 that operates by receiving electric power from the power unit 110 and controls overall operations, a communication unit 130 that enables communication to exchange data with the central server 10, a subject recognizer 141 that operates by receiving electric power from the power unit 110 and recognizes a user's unique information, a video image measuring device 142 that photographs a video image of a user to be shared with the central server 10, a video image processing unit 150 that processes a video image measured by the video image measuring device 142, a data matching unit 160 that matches the video image processed by the video image processing unit 150 with the data of the central server 10, a fixing unit 170 that is coupled to the holder 200, and an optical output unit 180 that irradiates near-infrared rays to the user.

The holder 200 may include a fixing member (not shown) capable of being coupled to the fixing unit 170 of the terminal 100, a motor driving unit 210 that receives electric power from the power unit 110 of the terminal 100 and operates by the control of the controller 120, and a motor 220 that operates according to signals from the motor driving unit 210 and adjusts the height of the holder.

The subject recognizer 141 may recognize at least one or more of RFID, QR, bar code, and fingerprint, but is not limited thereto.

The video image measuring device 142 may be preferably an RGB camera and a thermal imaging camera, but is not limited thereto.

The controller 120 may determine whether the user's face is at the center of the video image measuring device 142 in the video image measuring device 142. In this case, the controller 120 may measure biological signals using the near-infrared light output from the optical output unit 180 and the R value among RGB.

The wavelength of the near-infrared laser output from the optical output unit 180 may be preferably a wavelength of 660 nm and 940 nm, but is not limited thereto.

The holder 200 may further include a moving member 240 that allows movement. In addition, a holder fixing unit (not shown) that may be fixed to the floor or wall may be further provided when fixation rather than movement is required.

The height-adjustable biological signal measurement method may first recognize the user's unique information in the subject recognizer 141 of the terminal 100 (S100).

The method of recognizing the user's unique information in the subject recognizer 141 may recognize by using at least one or more of RFID, QR, bar code, and fingerprint, but is not limited thereto.

When the user recognition is completed (S100), the focus of the video image measuring device 142 may be set to a preset value (S110). In this case, the focus to be set may be a focus setting according to the distance between the terminal and the subject. The focus setting value according to the distance between the terminal and the subject may be stored in the central server 10 and may be changeable depending on the installed environment.

When the focus of the video image measuring device 142 is set (S110), the video image measuring device 142 may photograph and acquire the user's video image (S120). In this case, photographing video images may be adjustable in height while the terminal 100 moves and photographs video images from the top to the bottom of the holder 200. Image data may be acquired from the photographed video image data, and the images may be preprocessed by the video image processing unit 150 (S130).

When the image is pre-processed (S130), a face according to the user's state may be recognized using the pre-processed image (S140). At this time, the face recognition processing may continue according to the user's state, such as a sitting state, a state of sitting in a wheelchair, a posture according to a skeletal structure, and a standing state. That is, in a sitting state, the travel distance will be long when the terminal 100 moves from the top to the bottom of the holder 200 and in a standing state, the travel distance will be short when the terminal 100 moves from the top to the bottom of the holder 200.

After processing the user's state and face recognition, whether the user's face is at the center of the screen may be determined in the central server 10 (S150). When it is determined that the user's face is at the center of the screen, the position of the terminal 100 may be fixed and the user's biometric information may be measured (S160).

When measuring the user's biometric information, the optical output unit 180 of the terminal 100 may irradiate near-infrared rays to the user's face and the video image measuring device 142 may analyze a video image of the irradiating near-infrared rays to measure the user's biological signal.

In the step S130 of acquiring an image from the photographed video image data and preprocessing the image, the image preprocessing may be a process of converting an image of an RGB channel into HSV (H: Hue, S: Saturation, V: Value). At this time, the acquired image may be tabulated by putting RGB values and HSV values into data. At this time, the range to acquire RGB values and HSV values may be obtained from the value of the preset range and may be changeable depending on the user's setting, but RGB values corresponding to the position of the analysis target coordinate 20 may be acquired in the present disclosure.

The step (S140) of recognizing the user's state and face may be preprocessed in the video image processing unit 150 and recognizes the user's state and face using a data table of RGB values and HSV values of the analysis target coordinate 20.

The user's state and face may be recognized by comparing in the central server 10 a data table of RGB values and HSV values for standard images in which the user's face is at the center of the screen with the data of RGB values and HSV values of the acquired image before the step of recognizing the user's state and face (S140).

The data table for RGB values and HSV values for standard images stored in the central server 10 may be created in the video image processing unit 150, and the video image processing unit may first load from the central server 10 and insert the standard image in which the user's face is at the center of the screen (S10) to convert the image of the inserted RGB channel to HSV (S11).

At this time, the formula for converting from the RBG channel model to the HSV model is as follows.

$$I = \frac{1}{3}(R + G + B) \qquad \text{[Equation 1]}$$

$$S = 1 - \frac{3}{(R + G + B)}[\min(R, G, B)]$$

$$H = \cos^{-1}\left[\frac{\frac{1}{2}[(R-G)+(R-B)]}{\sqrt{(R-G)^2(R-B)(G-B)}}\right]$$

The converted HSV image may be segmented into regions (S12). In this case, the segmentation may be any one of two, four, six, and eight, but is not limited thereto.

Referring to FIG. 3, the image region may be segmented into a first split screen 1 and a second split screen 2, referring to FIG. 4, the image region may be segmented into a first split screen 1, a second split screen 2, a third split screen 3, and a fourth split screen 4, and referring to FIG. 5, the image region may be segmented a first split screen 1, a second split screen 2, a third split screen 3, a fourth split screen 4, a fifth split screen 5, and a sixth split screen 6. This may vary according to a preset value.

The video image processing unit 150 may analyze RGB values and HSV values corresponding to the analysis target coordinate 20 among the images whose region is segmented and put into data to store in the central server 10 in the form of a table (S13). At this time, the H value, S value, and V value of the analysis target coordinate 20 among the split screens may be stored in the central server 10.

The learning data may be stored in the central server 10 while accumulatively learning from the resultant data by continuously repeating steps ranging from the step S10 of loading from the central server 10 and inserting the standard image in which the user's face is at the center of the screen to the step S13 of analyzing the image and storing the data. At this time, a plurality of standard images may be stored in the central server 10, and the images may be analyzed sequentially or randomly.

RGB values and HSV values corresponding to the analysis target coordinate 20 of the user's preprocessed image to be analyzed may be matched in the data matching unit 160 using the data table stored in the central server 10 (S15). In this case, the unique RGB value and the HSV value according to the color of the entire analysis target coordinate 20 may be compared. When RGB values and HSV values learned as described above in the central server 10 and RGB values and HSV values of the user's image to be analyzed are matched, it may be determined whether the image to be processed is matched (S16).

When the image to be processed is matched, the step S160 of fixing the position of the terminal and measuring the user's biometric information may be performed.

When the image to be processed is not matched, the values of a first region (A), a second region (B), and a third region (C) among RGB values and HSV values in the analysis target coordinate 20 may be matched (S17). At this time, The first region A may be assumed to be the philtrum between the nose and lips, the second region B may be the lips, and the third region C may be assumed to be the chin, but is not limited thereto.

When the values of the first region A to the third region C are matched, it may be determined whether the region data of the image to be processed is matched (S18).

When the region data of the image to be processed is matched, the step S160 of fixing the position of the terminal and measuring the user's biometric information may be performed.

When the region data of the image to be processed is not matched, the step S120 of acquiring the user's video image from the video image measuring device 142 may be performed again.

Although the exemplary embodiments of the present disclosure have been described in detail above, the scope of the present disclosure is not limited thereto, and various modifications and improvements of those skilled in the art using the basic concepts of the present disclosure defined in the following claims also belong to the scope of the present disclosure.

What is claimed is:

1. A driving method for a height-adjustable biological signal measuring device, the method comprising:
a step of recognizing a user's unique information;
a step of setting a focus of a video image measuring device to a preset value when a user recognition is completed;
a step of photographing the user and acquiring the user's images from the video image measuring device when the focus of the video image measuring device is set;
a step of acquiring image data from the photographed video image and preprocessing the image in a video image processing unit;
a step of recognizing a face according to the user's state using a pre-processed image when the image is pre-processed;
a step of determining whether the user's face is at a center of a screen after processing the user's state and face recognition; and
a step of fixing a position of a terminal and measuring the user's biometric information when the user's face is determined to be at the center of the screen,
wherein the user's bio-signals are measured by irradiating the user's face with near-infrared rays from an optical output unit of the terminal and by analyzing the irradiating near-infrared rays with the video image measuring device,
wherein the step of recognizing the user's state and face comprises: recognizing the user's state and face by comparing data of RGB values and HSV values of the acquired image with a data table including RGB values and HSV values of a plurality of reference images in which the user's face is considered as positioning at the center of the screen stored in a central server.

2. The method of claim 1, wherein the user's unique information in a subject recognizer is recognized using at least one of RFID, QR, bar code, and fingerprint.

3. The method of claim 1, wherein a focus that is set to the preset value in the step of setting the focus of the video image measuring device is a focus setting according to a distance between the terminal and a subject, wherein the focus setting value according to the distance between the terminal and the subject is stored in the central server and is changeable according to an installed environment.

4. The method of claim 1, wherein in the step of photographing and acquiring the user's video images from the video image measuring device, photographing a video image is adjustable in height while the terminal moves and photographs video images from a top of a holder to a bottom.

5. The method of claim 1, wherein in the step of acquiring images from the photographed video image data and preprocessing the images, the image preprocessing is a process of converting an image of an RGB channel into HSV, and the acquired images are tabulated by putting the RGB value and HSV value into data.

6. The method of claim 5, wherein the RGB value and the HSV value are obtained from an area corresponding an analysis target coordinate in the face.

7. The method of claim 1, wherein the data table including the RGB values and the HSV values of the plurality of reference images stored in the central server is created in the video image processing unit, and the method further comprises:
- a step of loading from the central server and inserting the plurality of reference images in which the user's face is considered as positioning at the center of the screen;
- a step of converting an image of the inserted RGB channel to HSV;
- a step of segmenting the converted HSV image into a region;
- a step of analyzing in the video image processing unit the RGB values and HSV values corresponding to an analysis target coordinate among the images whose region is segmented, and putting into data to store into the central server in a form of a table;
- a step of matching in a data matching unit the RGB and HSV values corresponding to the analysis target coordinate of the user's preprocessed image to be analyzed using the data table stored in the central server; and
- a step of determining whether the image to be processed is matched when the table of RGB values and HSV values learned as above in the central server matches the table of RGB values and HSV values of the user's image to be analyzed, wherein the position of the terminal is fixed and the user's biometric information is measured when the image to be processed is matched.

8. The method of claim 7, wherein in the step of segmenting the converted HSV image into the region, the segmentation is any one of two, four, six, and eight.

9. The method of claim 7, wherein a learning data is stored in the central server while accumulatively learning from a resultant data by continuously repeating steps ranging from the step of loading from the central server and inserting the plurality of reference images in which the user's face is considered as positioning at the center of the screen to the step of analyzing the image and storing the data.

10. The method of claim 9, wherein the plurality of references images are stored in the central server and are analyzed sequentially or randomly.

11. The method of claim 7, wherein in the data matching unit the RGB values and HSV values corresponding to the analysis target coordinate of the user's preprocessed image to be analyzed is compared with the unique RGB values and HSV values according to the color of the entire analysis target coordinate using the data table stored in the central server.

12. The method of claim 7, further comprising:
- a step of matching values of a first region, a second region, and a third region among the RGB values and HSV values in the analysis target coordinate when the image to be processed is not matched in the step of determining whether the image to be processed is matched when matching the table of RGB values and HSV values learned as above in the central server with the table of RGB values and HSV values of the user's image to be analyzed.

13. The method of claim 12, further comprising:
- a step of determining whether a region data of the image to be processed is matched when matching the first to third region values; and
- a step of fixing the position of the terminal and measuring the user's biometric information when the region data of the image to be processed is matched.

14. The method of claim 13, wherein a step of acquiring the user's video images from the video image measuring device is performed when the region data of the image to be processed is not matched in the step of determining whether the region data of the image to be processed is matched when matching the first to third region values.

* * * * *